United States Patent
Kim et al.

(10) Patent No.: US 8,363,581 B2
(45) Date of Patent: Jan. 29, 2013

(54) POWER SAVING METHOD AND APPARATUS USING MULTIPLE CHANNELS

(75) Inventors: Jae-Hoon Kim, Seoul (KR); Young-Gon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 11/790,988

(22) Filed: Apr. 30, 2007

(65) Prior Publication Data
US 2008/0037570 A1    Feb. 14, 2008

(30) Foreign Application Priority Data
Aug. 11, 2006    (KR) .................. 10-2006-0076117

(51) Int. Cl.
*G08C 17/00* (2006.01)
(52) U.S. Cl. ...................................................... 370/311
(58) Field of Classification Search .................. None
See application file for complete search history.

(56) References Cited

U.S. PATENT DOCUMENTS

| | | | |
|---|---|---|---|
| 7,643,790 B2 | 1/2010 | Jang et al. | |
| 2002/0072329 A1* | 6/2002 | Bandeira et al. | 455/7 |
| 2003/0063563 A1* | 4/2003 | Kowalski | 370/230 |
| 2003/0198246 A1* | 10/2003 | Lifshitz et al. | 370/445 |
| 2004/0143681 A1* | 7/2004 | Benveniste | 709/249 |
| 2005/0047357 A1* | 3/2005 | Benveniste | 370/311 |
| 2005/0152324 A1* | 7/2005 | Benveniste | 370/338 |
| 2006/0013129 A1 | 1/2006 | Sterenson et al. | |
| 2006/0104301 A1* | 5/2006 | Beyer et al. | 370/445 |
| 2006/0251119 A1* | 11/2006 | Ramesh | 370/468 |
| 2007/0014269 A1* | 1/2007 | Sherman et al. | 370/338 |
| 2007/0064720 A1* | 3/2007 | Sterenson et al. | 370/445 |
| 2007/0070937 A1* | 3/2007 | Demirhan et al. | 370/328 |
| 2009/0122768 A1* | 5/2009 | Nakashima et al. | 370/338 |

FOREIGN PATENT DOCUMENTS

JP    2004-364308    12/2004

OTHER PUBLICATIONS

Korean Office Action issued Aug. 16, 2012 in counterpart Korean Application No. 10-2006-0076117 (3 pages, in Korean).

* cited by examiner

*Primary Examiner* — Chirag Shah
*Assistant Examiner* — Minh-Trang Nguyen
(74) *Attorney, Agent, or Firm* — NSIP Law

(57) ABSTRACT

A power saving method and apparatus are provided for saving power by reducing the number of changes between active mode and sleep mode using multiple channels. A process for negotiating which of multiple channels will be assigned a transmission opportunity (TXOP) is performed. A TXOP MAP is configured by exchanging a packet through a common channel during a predetermined time at every monitoring time according to a negotiated channel. The TXOP is allocated to each channel according to the TXOP MAP. As a change between the active mode and the sleep mode is reduced, power can be saved, resources of the mesh network can be efficiently used, and interference between nodes can be reduced.

22 Claims, 4 Drawing Sheets

POWER SAVING METHOD AND APPARATUS USING MULTIPLE CHANNELS

CROSS-REFERENCE TO RELATED PATENT APPLICATION

This application claims the benefit under 35 U.S.C. §119 (a) of Korean Patent Application No. 2006-76117, filed Aug. 11, 2006, in the Korean Intellectual Property Office, the entire disclosure of which is hereby incorporated by reference.

BACKGROUND OF THE INVENTION

1. Field of the Invention

The present invention relates to a power saving method and apparatus for use in a mesh network. More particularly, the present invention relates to a power saving method and apparatus for saving power by reducing the number of changes between active mode and sleep mode using multiple channels.

2. Description of the Related Art

A conventional power saving method will be described with reference to FIG. 1. FIG. 1 illustrates a transmission opportunity (TXOP) allocation based on a TXOP media access plan (MAP) in a conventional wireless local area network (WLAN).

The TXOP between node A and node B during interval t1 is TXOPi, the TXOP between the node A and node C during interval t2 is TXOPj, and the TXOP between node C and node D during interval t3 is TXOPk.

In FIG. 1, a change between active mode and sleep mode frequently occurs in nodes C and D. Specifically, node C is in sleep mode during interval t1 and is in active mode during interval t2. During interval t3 and the remaining service interval (SI), node C is in sleep mode. Node D is in sleep mode during intervals t1 and t2 and is in the active mode during interval t3. During other intervals, node D is in sleep mode. Since a change between active mode and sleep mode frequently occurs in nodes C and D, node power is quickly consumed.

The conventional technology has a complex mechanism because all TXOPs are allocated within a single channel. Because resources are shared in the single channel in the conventional technology, each node cannot use resources other than its own TXOP.

On the other hand, a mesh network has a multipoint-to-multipoint structure, which is different from the Institute of Electrical and Electronics Engineers (IEEE) 802.11 structure. When the mesh network with the multipoint-to-multipoint structure uses the conventional technology, a TXOP allocation mechanism is more complex and the resource use rate is more degraded. Further, when the active and sleep modes of each node are repeated within an SI in the mesh network as illustrated in FIG. 1, the lifetime is shortened due to increased power consumption.

Accordingly, there is a need for an improved power saving method and apparatus that can save power by reducing changes between active mode and sleep mode using multiple channels.

SUMMARY OF THE INVENTION

Exemplary embodiments of the present invention address at least the above problems and/or disadvantages and provide at least the advantages described below. Accordingly, an aspect of an exemplary embodiment of the present invention is to provide a power saving method and apparatus that can save power by reducing changes between active mode and sleep mode using multiple channels.

Another aspect of an exemplary embodiment of the present invention is to provide a channel negotiation method using multiple channels.

Another aspect of an exemplary embodiment of the present invention is to provide unique transmission opportunities (TXOPs) in distributed communication service intervals by configuring a TXOP MAP in multiple channels.

Another aspect of an exemplary embodiment of the present invention is to acquire information from overhearing traffic by actively setting a time for sharing a common channel according to traffic variation and to exchange information through the common channel according to network density and traffic presence.

Another aspect of an exemplary embodiment of the present invention is to improve network performance by maximizing the use of resources and minimizing interference while saving power.

In accordance with another aspect of an exemplary embodiment of the present invention, there is provided a power saving method for use in a mesh network, comprising the steps of: negotiating which of multiple channels will be assigned a transmission opportunity (TXOP); configuring a TXOP MAP by exchanging a packet through a common channel during a predetermined time at every monitoring time according to a negotiated channel; and allocating the TXOP to each channel according to the TXOP MAP.

In accordance with another aspect of an exemplary embodiment of the present invention, there is provided a power saving apparatus for use in a mesh network, comprising: a memory for storing a power saving control program; and a controller connected to the memory, wherein the controller negotiates which of multiple channels will be assigned a transmission opportunity (TXOP), configures a TXOP MAP by exchanging a packet through a common channel during a preset time at every monitoring time according to a negotiated channel, and allocates the TXOP to each channel according to the TXOP MAP.

In accordance with another aspect of an exemplary embodiment of the present invention, there is provided a power saving system for use in a mesh network, comprising: a first node for negotiating with a second node for an available channel, advertising a negotiated channel, configuring a transmission opportunity (TXOP) MAP according to advertisement, and allocating a TXOP according to the TXOP MAP; and the second node for negotiating with the first node for the available channel, receiving the advertisement, configuring the TXOP MAP according to the advertisement, and having the TXOP allocated according to the configured TXOP MAP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

First, a general overview of exemplary embodiments of the present invention will be described.

Exemplary embodiments of the invention propose a power saving method and apparatus for use in a mesh network. In particular, an exemplary embodiment of the present invention proposes a power saving method and apparatus for saving power by reducing the number of changes between an active mode and a sleep mode using multiple channels.

Nodes in a pair are in the active mode while a transmission opportunity (TXOP) is allocated thereto. The nodes in the pair are in the sleep mode while the TXOP is not allocated thereto. When the number of changes between the active mode and the sleep mode is large in the nodes in the pair, power consumption increases and lifetime decreases in a mesh network.

To reduce power consumption, nodes in one pair for configuring a TXOP negotiate which of multiple channels will be assigned the TXOP. Further, the nodes in the pair configure a TXOP MAP by exchanging a packet through a common channel during a predetermined time at every monitoring time according to the negotiated channel. Consequently, the nodes in the pair allocate the TXOP to each channel according to TXOP MAP.

An exemplary embodiment of the invention allocates a TXOP to one pair of nodes using multiple channels. Therefore, an exemplary embodiment of the present invention can reduce the complexity of a TXOP MAP configuration mechanism in comparison with the case where a single channel is used. Moreover, an embodiment of the present invention can increase resource use rate using the multiple channels and decrease interference. Furthermore, an embodiment of the present invention can improve network performance by adaptively allocating a TXOP according to the traffic situation in a multipoint-to-multipoint communication environment such as a mesh network.

Next, a negotiation method for a channel, to which a TXOP is allocated between nodes of one pair in the power saving method, will be described with reference to FIG. 2. An exemplary embodiment of the present invention uses a method for establishing a channel by including channel list information when a TXOP is set.

Figure 1:
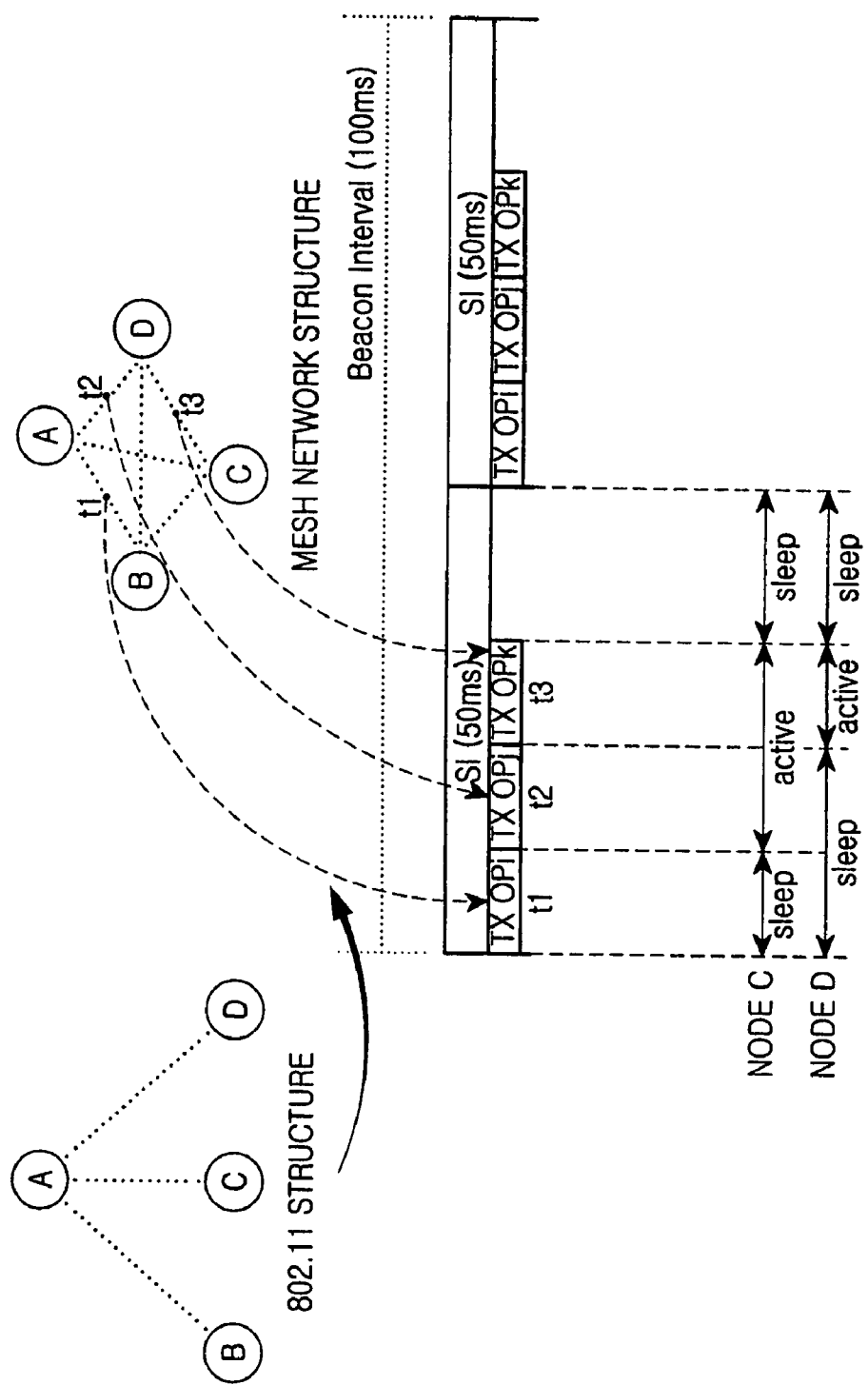
FIG. 1 illustrates transmission opportunity (TXOP) allocation based on a TXOP MAP in a conventional wireless local area network (WLAN)
Figure 2:
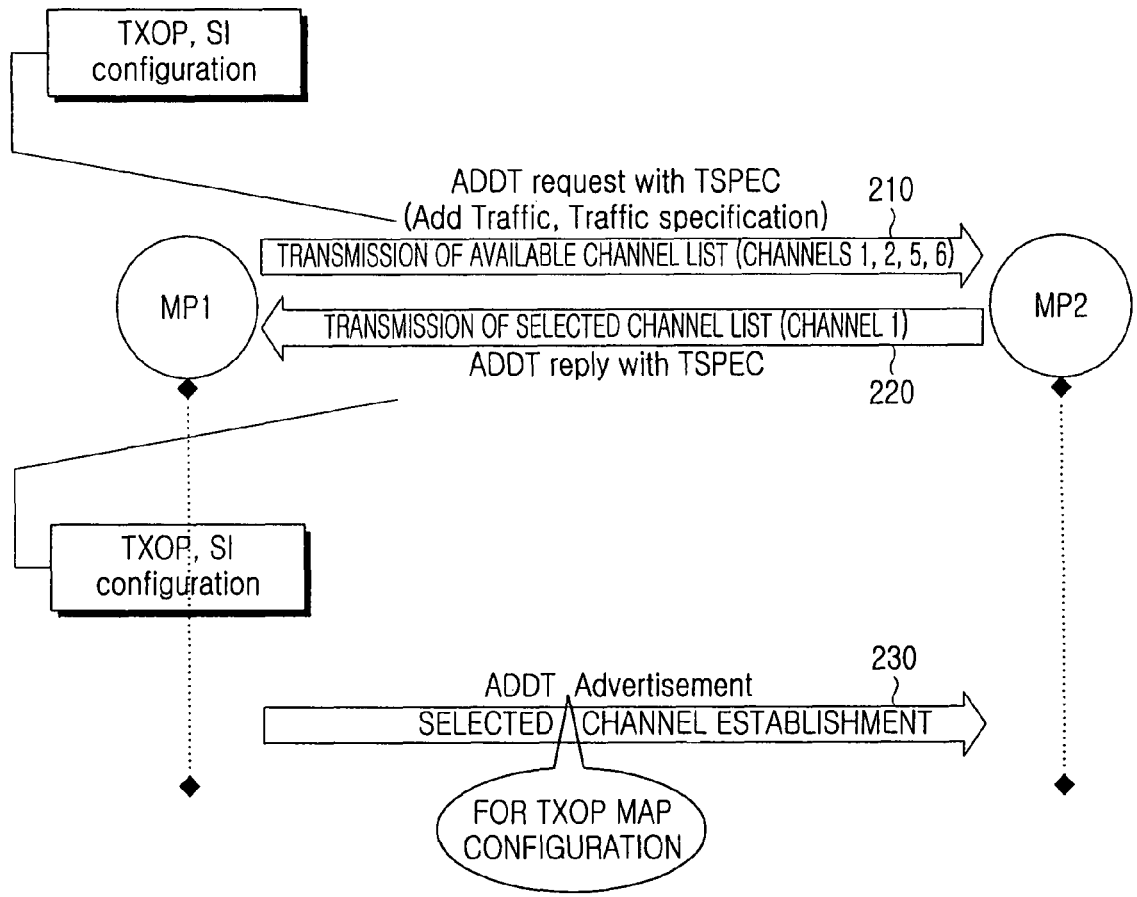
FIG. 2 illustrates a channel negotiation process in accordance with an exemplary embodiment of the present invention.

FIG. 2 illustrates a channel negotiation process in accordance with an exemplary embodiment of the present invention. Referring to FIG. 2, a first node MP1 transmits an available channel list to a second node MP2 in step 210. Herein, the transmission of the available channel list is achieved by making an add traffic (ADDT) reply with the traffic specification (TSPEC), and a TXOP is set using ADDT and TSPEC values.

In step 220, the second node MP2 selects a channel from the channel list received from the first node MP1 and transmits a selected channel list to the first node MP1. Herein, the available channel list transmission is achieved by making an ADDT reply with TSPEC. For example, when receiving a list of channels 1, 2, 5, 6 from the first node MP1, the second node MP2 can provide the first node MP1 with channel 1 as a response in step 220.

In step 230, the first node MP1 establishes the selected channel. The establishment of the selected channel is achieved by advertising the ADDT. Further, the ADDT advertisement can be extracted from a structure of a TXOP and a service interval (SI). The advertisement of the established channel can be used to configure a TXOP MAP. When a TXOP is allocated to the multiple channels, the advertisement of the established channel can be used to configure a MAP indicating which channel is communicated in each TXOP by a channel mapping process.

Next, a method for configuring a TXOP MAP in accordance with an exemplary embodiment of the present invention will be described with reference to FIG. 3.

Figure 3:
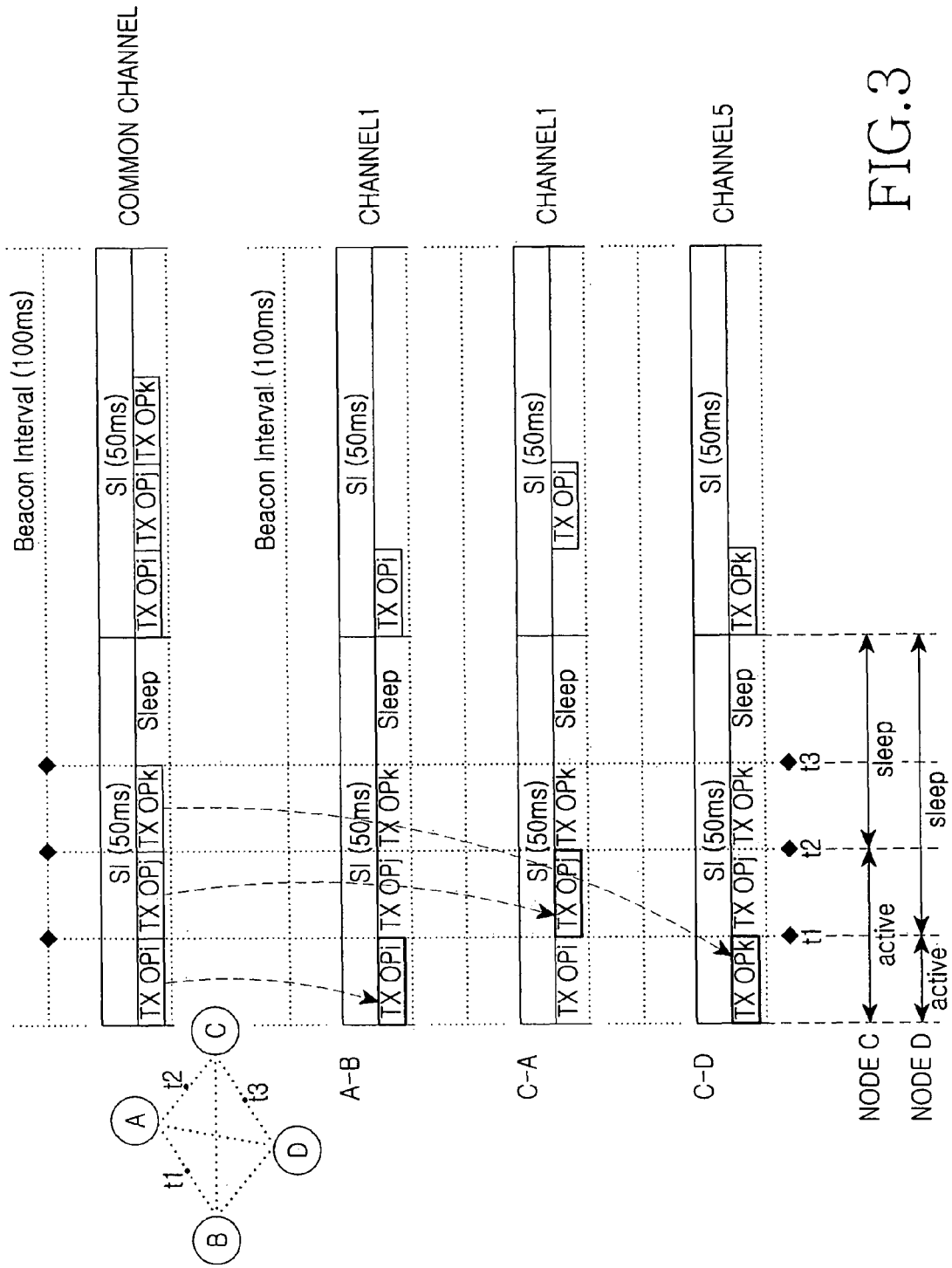
FIG. 3 illustrates a process for configuring a TXOP MAP and allocating a TXOP in accordance with an exemplary embodiment of the present invention.

FIG. 3 illustrates the method for configuring a TXOP MAP in accordance with an exemplary embodiment of the present invention.

Referring to FIG. 3, an exemplary embodiment of the invention configures a TXOP between node A and node B in interval t1 is TXOPi, a TXOP between node A and node C in interval t2 is TXOPj, and a TXOP between node C and node D in interval t3 is TXOPk. Further, an exemplary embodiment of the invention establishes that a beacon interval is 100 ms and two SIs, each having the length of 50 ms, are included in the beacon interval.

In accordance with an exemplary embodiment of the present invention, a common channel has TXOPi, TXOPj, TXOPk and a sleep interval in the two 50 ms SIs. Herein, the exemplary embodiment of the present invention configures a MAP for indicating how to allocate TXOPs to multiple channels. That is, an exemplary embodiment of the present invention reduces the number of changes between the sleep mode and the active mode in nodes of one pair for configuring each TXOP by adaptively allocating TXOPi, TXOPj and TXOPk to the channels.

In accordance with an exemplary embodiment of the present invention, TXOPi of the common channel is allocated to a channel 1 and TXOPj of the common channel is also allocated to the channel 1. Further, TXOPk of the common channel is allocated to a channel 5. The channels 1 and 5 are channels used for illustrative purpose. The channels 1 and 5 can differ according to TSPEC and ADDT.

Channel 1 is assigned TXOPi and TXOPj. Herein, TXOPi is the TXOP between node A and node B and TXOPj is the TXOP between node A and node C. That is, in the channel 1, node A is assigned both TXOPi and TXOPj. Further, an exemplary embodiment of the present invention temporally continuously connects TXOPi and TXOPj in order to reduce the number of changes between the sleep mode and the active mode of the node A. Since the number of changes between the sleep mode and the active mode is reduced, power can be saved.

The channel 5 is assigned TXOPk in a time slot in which TXOPi is set in the common channel. TXOPk is allocated to reduce the number of changes between the sleep mode and the active mode in nodes C and D. Node C is assigned TXOPj in a second time slot of channel 1. Thus, node C allocates TXOPk in a first time slot of channel 5 to sequentially allocate TXOPj and TXOPk, thereby reducing the number of changes between the active mode and the sleep mode of node C. Because a TXOP used in node D is absent, TXOPk is allocated in the first time slot. Node D is in the active mode only in the first time slot and is in the sleep mode in the remaining time slot. Also in the case of node D, the number of changes between the active mode and the sleep mode is reduced and therefore power is saved.

Figure 4:
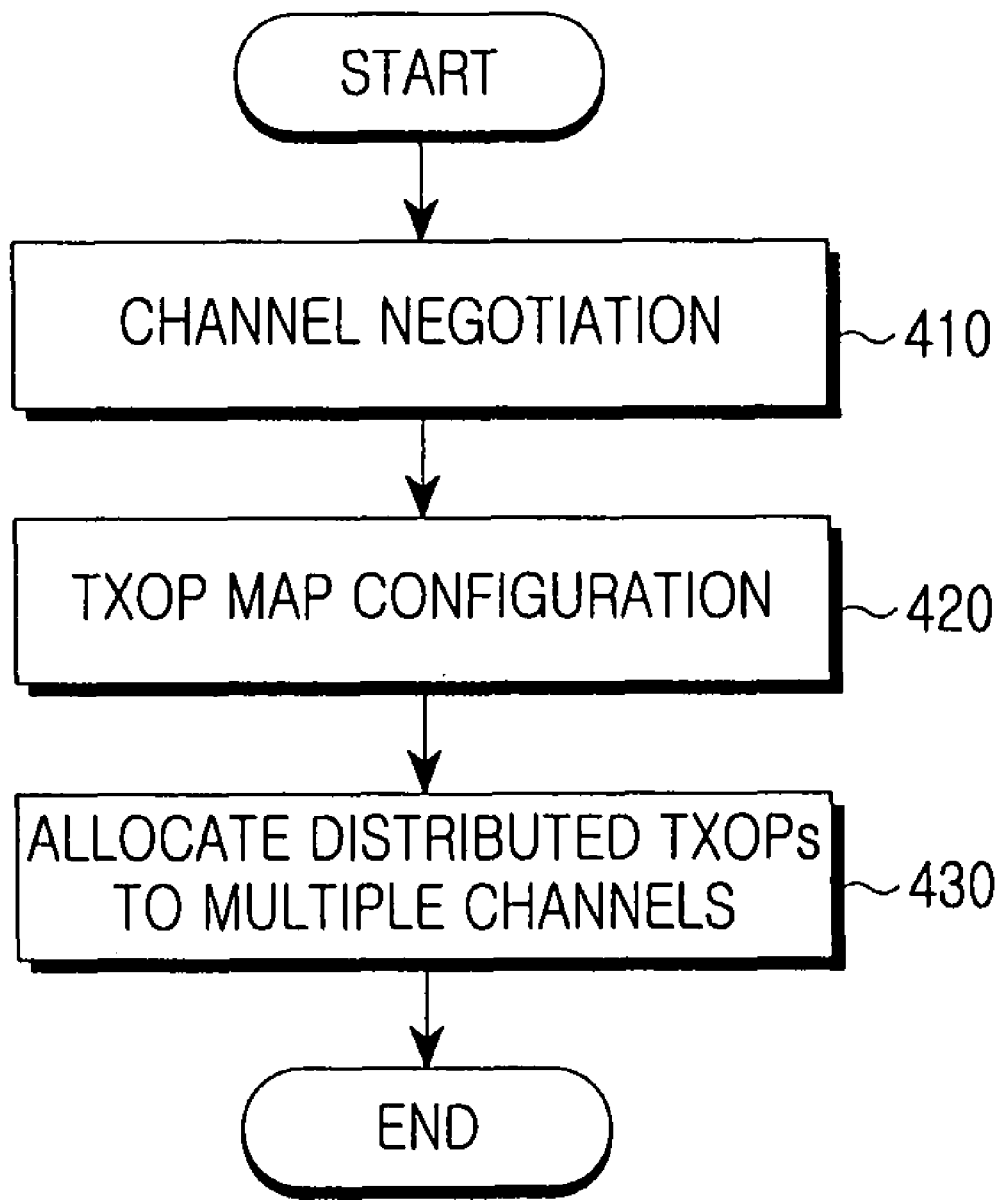
FIG. 4 is a flowchart illustrating a power saving method in accordance with an exemplary embodiment of the present invention.

Next, a summary of an exemplary embodiment of the present invention will be provided. When the first node has multiple TXOPs, they are temporally continuously allocated to the first channel. Since node A has two TXOPs in FIG. 3, they are sequentially coupled to the channel 1. When the first and second nodes have a TXOP and the second and third nodes have a TXOP, the TXOP of the second and third nodes is allocated in the time slot of the second channel that is capable of being temporally continuously coupled. Referring to FIG. 4, because TXOPj is present in the channel 1 when TXOPk is allocated, TXOPk is allocated in the first time slot that is capable of being sequentially coupled to TXOPj.

An exemplary embodiment of the present invention can also have an additional effect beyond saving power by reducing the number of changes between the sleep mode and the active mode. There is a problem in that other nodes cannot use a TXOP in a TXOP time of a node in the case of a single channel. However, in an exemplary embodiment of the present invention, the TXOP can be used in the other nodes. That is, an exemplary embodiment of the present invention can increase resource reuse rate because the other nodes can additionally use the TXOP, during a time other than the TXOP time, through the multiple channels. Moreover, an exemplary embodiment of the present invention can use a simple mechanism in the multiple channels rather than a complex mechanism used in the single channel. Moreover, an exemplary embodiment of the present invention can allocate a TXOP to the nodes using the multiple channels. Thus, an exemplary embodiment of the present invention can address a complex mutual interference problem.

Next, a method for adaptively setting a TXOP monitoring time in accordance with an exemplary embodiment of the present invention will be described.

For example, two 50 ms SIs are used in a 100 ms beacon interval as illustrated in FIG. 3. To adaptively use the SIs, a parameter indicating the number of SIs available in the common channel is set to N.

An exemplary embodiment of the present invention exchanges a management/control frame or broadcast packet through the common channel during a monitoring time whenever a time of N×SI is reached. Herein, the monitoring time is a monitoring time in the common channel.

The parameter N with an integer is important since it determines the number for SIs available in the common channel. When the number of SIs available in the common channel for communication of the nodes is large, the communication can be interrupted. On the other hand, when the number of SIs available in the common channel is small, the management or control frame cannot be received.

An exemplary embodiment of the present invention configures a new TXOP map at every end of service period (EOSP) in order to compute the number N of SIs available in the common channel. Further, an exemplary embodiment of the present invention adaptively sets the TXOP according to the ambient environment. That is, an exemplary embodiment of the present invention can effectively set the N value according to the traffic situation.

A traffic aware parameter $F(T, n)$ is used for channel allocation, where T is a traffic amount and n is the number of active nodes. Herein, the traffic aware parameter $F(T, n)$ and the number N of SIs available in the common channel have the relationship as shown in Equation (1).

$$N \sim 1/F(T,n) \times \alpha \qquad (1)$$

Herein, symbol "~" indicates a linear relation, $\alpha$ is a value to be multiplied, and N is an integer. According to Equation (1), the number of SIs available in the common channel is in inverse proportion to the traffic aware parameter $F(T, n)$ and is in direct proportion to $\alpha$. The traffic amount T used in the traffic aware parameter is expressed by Equation (2).

$$T = \left\lceil \frac{SI \times \rho_i}{L_i} \right\rceil \qquad (2)$$

Herein, $L_i$ is an octal number indicating a size of a media access control (MAC) service data unit (MSDU) packet, and $\rho_i$ is the number of bits per second for indicating a mean bit rate for a packet transmission. The number n of active nodes used in the traffic aware parameter is the number of nodes currently performing communication or the number of active neighbor nodes in a neighbor node table or routing table.

Referring to Equations (1) and (2), the number of SIs available in the common channel can be defined as shown in Equation (3).

$$\min N = 1$$

$$\max N = 3 \times \text{Beacon Interval/Service Interval} \qquad (3)$$

When high traffic and many active nodes are present, mutual TXOP settings and routing settings are required. In this case, the probability of information exchange for resource management increases. In other words, when the number of active nodes increases, the number of packets for management or control increases.

A power saving method in accordance with an exemplary embodiment of the present invention will be described with reference to FIG. 4.

Referring to FIG. 4, nodes in one pair negotiate which of multiple channels will be assigned a TXOP in step 410. In particular, a first node transmits an available channel list to a second node. The second node transmits a channel list selected from the available channel list to the first node. Then, the first node establishes a selected channel. The establishment of the selected channel can be used to configure a TXOP MAP.

In step 420, the nodes in the pair configure the TXOP MAP. An exemplary embodiment of the present invention allocates TXOPs to the multiple channels, which is different from the prior art. An exemplary embodiment of the invention can reduce the number of changes between the sleep mode and the active mode of the nodes using the multiple channels in comparison with the case where a single channel is used. On the other hand, the TXOP MAP is configured at every monitoring time by exchanging a management frame, a control frame, or a broadcast packet. Further, the TXOP MAP is newly updated at every EOSP.

In step 430, the nodes in the pair allocate distributed TXOPs to the multiple channels. The TXOPs can be simultaneously allocated to the multiple channels. The TXOPs can be sequentially allocated to one channel. An ultimate object is to provide TXOP allocation that can reduce the number of changes between the sleep mode and the active mode. Therefore, each TXOP is allocated to one channel or other channels in a distributed scheme.

The power saving method in accordance with an exemplary embodiment of the present invention computes the number N of SIs available in the common channel to adaptively allocate TXOPs. Herein, the number N of SIs is computed using the traffic aware parameter. The traffic aware parameter is defined by a traffic amount and the number of active nodes.

An exemplary embodiment of the present invention can save power by including channel information when configuring a TXOP MAP in order to efficiently improve a power saving method and apparatus in a mesh network environment.

Moreover, an exemplary embodiment of the present invention can acquire information from overhearing traffic by actively setting a time of sharing a common channel according to traffic variation using multiple channels and can exchange information through the common channel according to network density and traffic presence.

Moreover, an exemplary embodiment of the present invention can reduce frequent changes between sleep and active modes using multiple channels in a mesh network, thereby saving power, maximizing resource use rate, minimizing interference, and maximizing network performance.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The present invention can be embodied in transmission media, for example, carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the present invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A power saving method for use in a network, the method comprising:
   negotiating which of multiple channels will be assigned a transmission opportunity (TXOP);
   configuring a TXOP map by exchanging a packet through a common channel during a predetermined time at every monitoring time according to a negotiated channel; and
   allocating a plurality of TXOPs to the multiple channels according to the configured TXOP map, including allocating a first TXOP to a first time slot of a first channel, and temporally and continuously allocating a second TXOP to a first time slot of a second channel to enable a first node and a second node to simultaneously transmit the first TXOP and the second TXOP, respectively, such that at least one of the first node and the second node transitions between a sleep state and an active state less in comparison to using a single shared channel.

2. The power saving method of claim 1, wherein the negotiating comprises:
   transmitting an available channel list from the first node for configuring the TXOP map to the second node;
   selecting a channel and transmitting the selected channel from the second node to the first node; and
   advertising the selected channel from the first node to the second node.

3. The power saving method of claim 1, wherein the plurality of TXOPs are set using traffic specification (TSPEC) and add traffic (ADDT) values.

4. The power saving method of claim 1, wherein the configuring the TXOP map comprises:
   performing a monitoring operation for configuring the TXOP map whenever a time computed by multiplying the number (N) of service intervals (SIs) available in the common channel by an SI is reached.

5. The power saving method of claim 4, wherein the number N of SIs available in the common channel is set to an integer in inverse proportion to a traffic aware parameter, and the traffic aware parameter is defined by a traffic amount and the number of active nodes.

6. The power saving method of claim 1, wherein the packet is one of a management frame, a control frame, and a broadcast packet.

7. The power saving method of claim 1, wherein the configuring the TXOP map comprises:
   updating the TXOP map at every end of service period (EOSP).

8. The power saving method of claim 1, wherein the configuring the TXOP map comprises:
   temporally and continuously allocating the plurality of TXOPs to the first channel when the first node has the plurality of TXOPs.

9. The power saving method of claim 1, wherein the configuring the TXOP map comprises:
   temporally and continuously allocating the first TXOP and the second TXOP to the multiple channels when the first node and the second node have the first TXOP and the second node and a third node have the second TXOP.

10. A power saving apparatus for use in a network, the apparatus comprising:
    a memory for storing a power saving control program; and
    a controller connected to the memory,
    wherein the controller negotiates which of multiple channels will be assigned a transmission opportunity (TXOP), configures a TXOP map by exchanging a packet through a common channel during a preset time at every monitoring time according to a negotiated channel, and allocates a plurality of TXOPs to the multiple channels according to the configured TXOP map, including allocating a first TXOP to a first time slot of a first channel, and temporally and continuously allocating a second TXOP to a first time slot of a second channel to enable a first node and a second node to simultaneously transmit the first TXOP and the second TXOP, respectively, such that at least one of the first node and the second node transitions between a sleep state and an active state less in comparison to using a single shared channel.

11. The power saving apparatus of claim 10, wherein the controller controls power in active mode while the plurality of TXOPs are allocated and controls the power in sleep mode while the plurality of TXOPs are not allocated.

12. The power saving apparatus of claim 10, wherein the plurality of TXOPs are set using traffic specification (TSPEC) and add traffic (ADDT) values.

13. The power saving apparatus of claim 10, wherein the controller performs channel negotiation by controlling an operation for transmitting a channel list to an opposite node for configuring the TXOP map, receiving a channel selected by the opposite node, and advertising the selected channel.

14. The power saving apparatus of claim 10, wherein the controller configures the TXOP MAP by temporally and continuously allocating the plurality of TXOPs to the first channel when the first node has the plurality of TXOPs.

15. The power saving apparatus of claim 10, wherein the controller configures the TXOP map by temporally and continuously allocating the first TXOP and the second TXOP to the multiple channels when the first node and the second node have the first TXOP and the second node and a third node have the second TXOP.

16. The power saving apparatus of claim 10, wherein the controller performs a monitoring operation for configuring the TXOP map whenever a time computed by multiplying the number (N) of service intervals (SIs) available in the common channel by an SI is reached.

17. The power saving apparatus of claim 16, wherein the number N of SIs available in the common channel is set to an integer in inverse proportion to a traffic aware parameter, and the traffic aware parameter is defined by a traffic amount and the number of active nodes.

18. A power saving system for use in a network, the power saving system comprising:
a first node for negotiating with a second node for an available channel, advertising a negotiated channel, configuring a transmission opportunity (TXOP) map according to the negotiated channel, and allocating a plurality of TXOPs according to the TXOP map, including allocating a first TXOP to a first time slot of a first channel, and temporally and continuously allocating a second TXOP to a first time slot of a second channel to enable the first node and a second node to simultaneously transmit the first TXOP and the second TXOP, respectively, such that at least one of the first node and the second node transitions between a sleep state and an active state less in comparison to using a single shared channel; and
the second node for negotiating with the first node for the available channel, receiving the negotiated channel, configuring the TXOP MAP according to the negotiated channel, and having the plurality of TXOPs allocated according to the configured TXOP map.

19. A non-transitory computer-readable recording medium for power saving in a network, the computer-readable recording medium being configured to be read by a computer system, the computer-readable recording medium comprising:
a first set of instructions for negotiating which of multiple channels will be assigned a transmission opportunity (TXOP);
a second set of instructions for configuring a TXOP map by exchanging a packet through a common channel during a predetermined time at every monitoring time according to a negotiated channel; and
a third set of instructions for allocating a plurality of TXOPs to the multiple channels according to the configured TXOP map, including allocating a first TXOP to a first time slot of a first channel, and temporally and continuously allocating a second TXOP to a first time slot of a second channel to enable a first node and a second node to simultaneously transmit the first TXOP and the second TXOP, respectively, such that at least one of the first node and the second node transitions between a sleep state and an active state less in comparison to using a single shared channel.

20. A power saving method for use in a network, the method comprising:
negotiating which of multiple channels will be assigned a transmission opportunity (TXOP);
configuring a TXOP map by exchanging a packet through a common channel during a predetermined time at every monitoring time according to a negotiated channel; and
allocating a first TXOP to a first time slot of a first channel, and temporally and continuously allocating a second TXOP to a first time slot of a second channel, according to the configured TXOP map to enable a first node and a second node to simultaneously transmit the first TXOP and the second TXOP, respectively, such that at least one of the first node and the second node transitions between a sleep state and an active state less in comparison to using a single shared channel.

21. The power saving method of claim 20, wherein the allocating comprises reducing the number of times at least one of the first node and the second node of the network transitions between the sleep state and the active state, in comparison to using the single shared channel, by temporally and continuously allocating the second TXOP to the first time slot of the second channel.

22. The power saving method of claim 20, wherein the exchanging comprises exchanging a packet through the common channel at the end of each service period to compute a number of service intervals available in the common channel, and the method further comprises configuring the TXOP map based on the computed number of service intervals available.

* * * * *